Sept. 5, 1950 T. S. JAMES ET AL 2,521,222
OXY-FUEL GAS CUTTING MACHINE
Filed Jan. 10, 1946 3 Sheets-Sheet 2
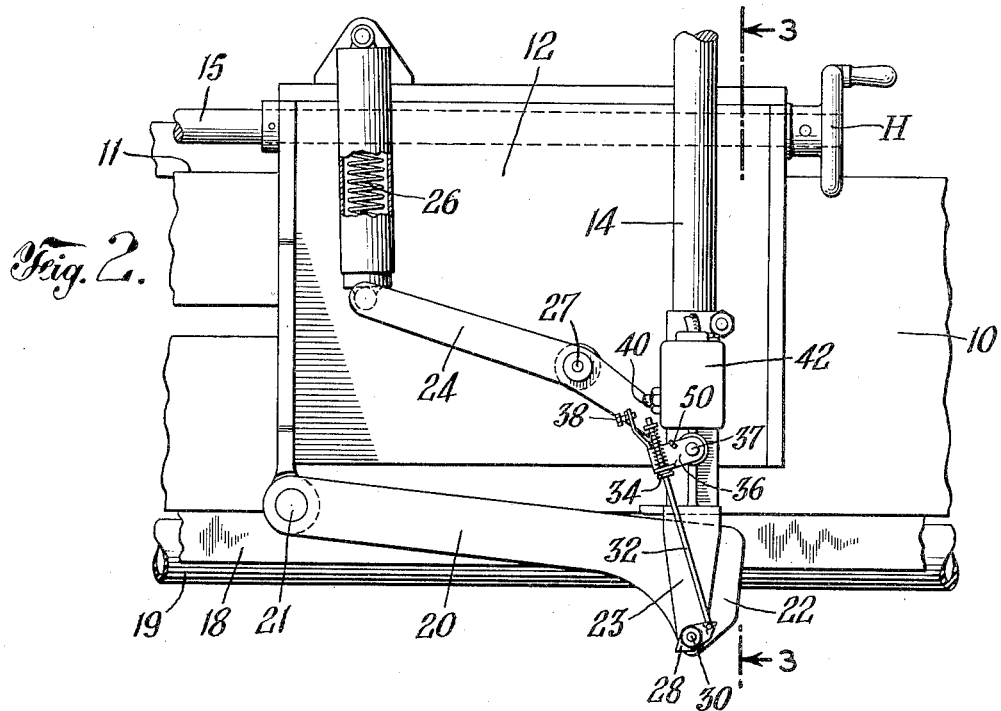
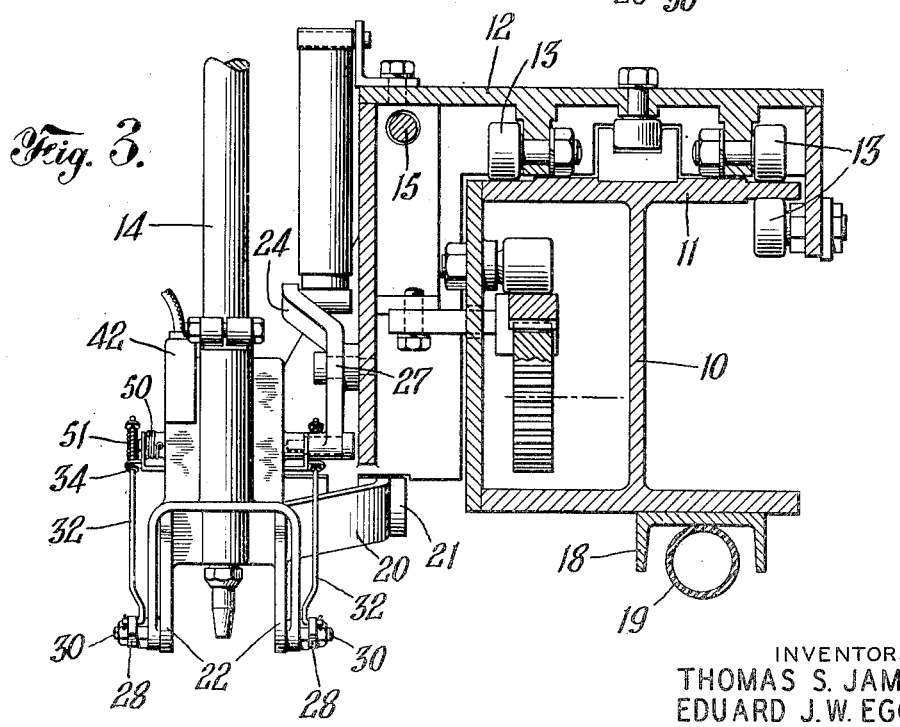
INVENTORS
THOMAS S. JAMES
EDUARD J.W. EGGER
BY
ATTORNEY Sept. 5, 1950 T. S. JAMES ET AL 2,521,222
OXY-FUEL GAS CUTTING MACHINE
Filed Jan. 10, 1946 3 Sheets-Sheet 3
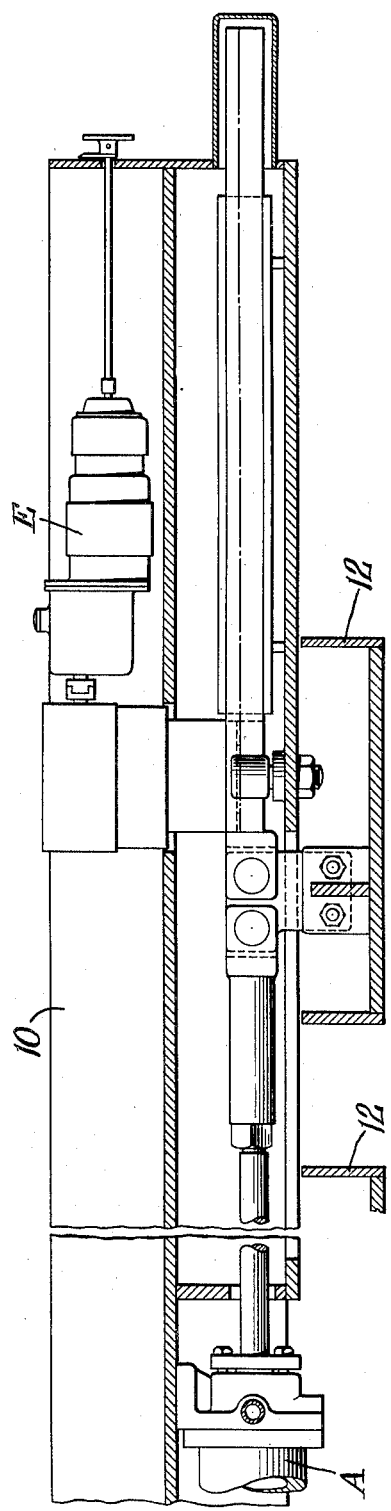
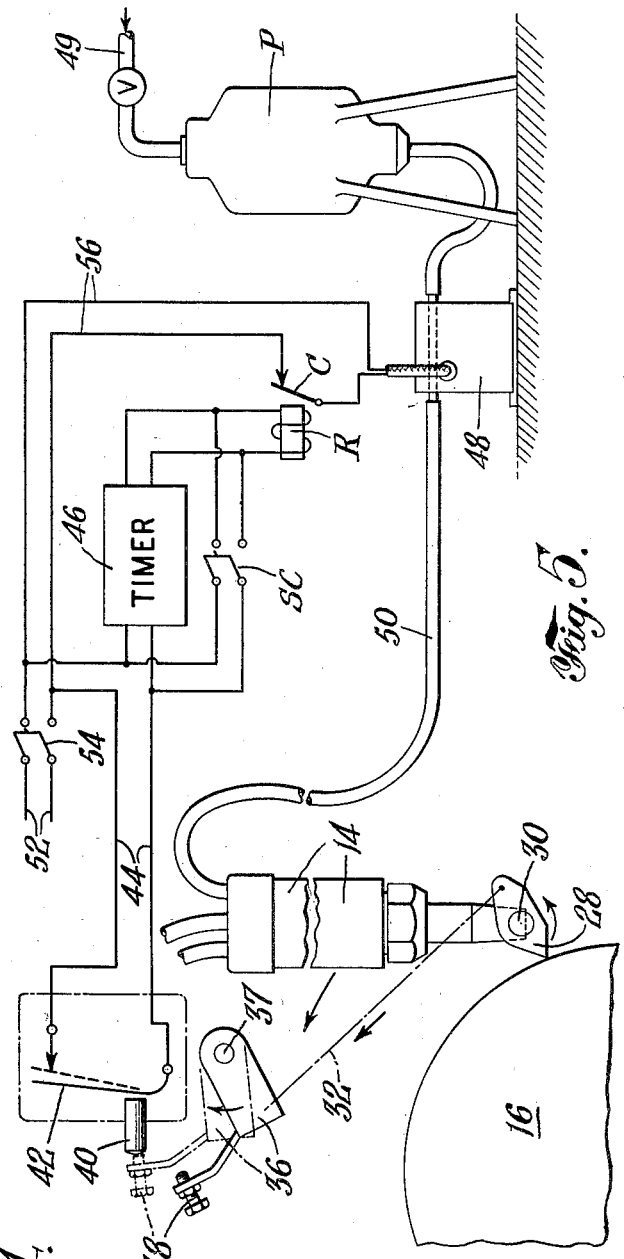
INVENTORS
THOMAS S. JAMES
EDUARD J. W. EGGER
BY
ATTORNEY Patented Sept. 5, 1950

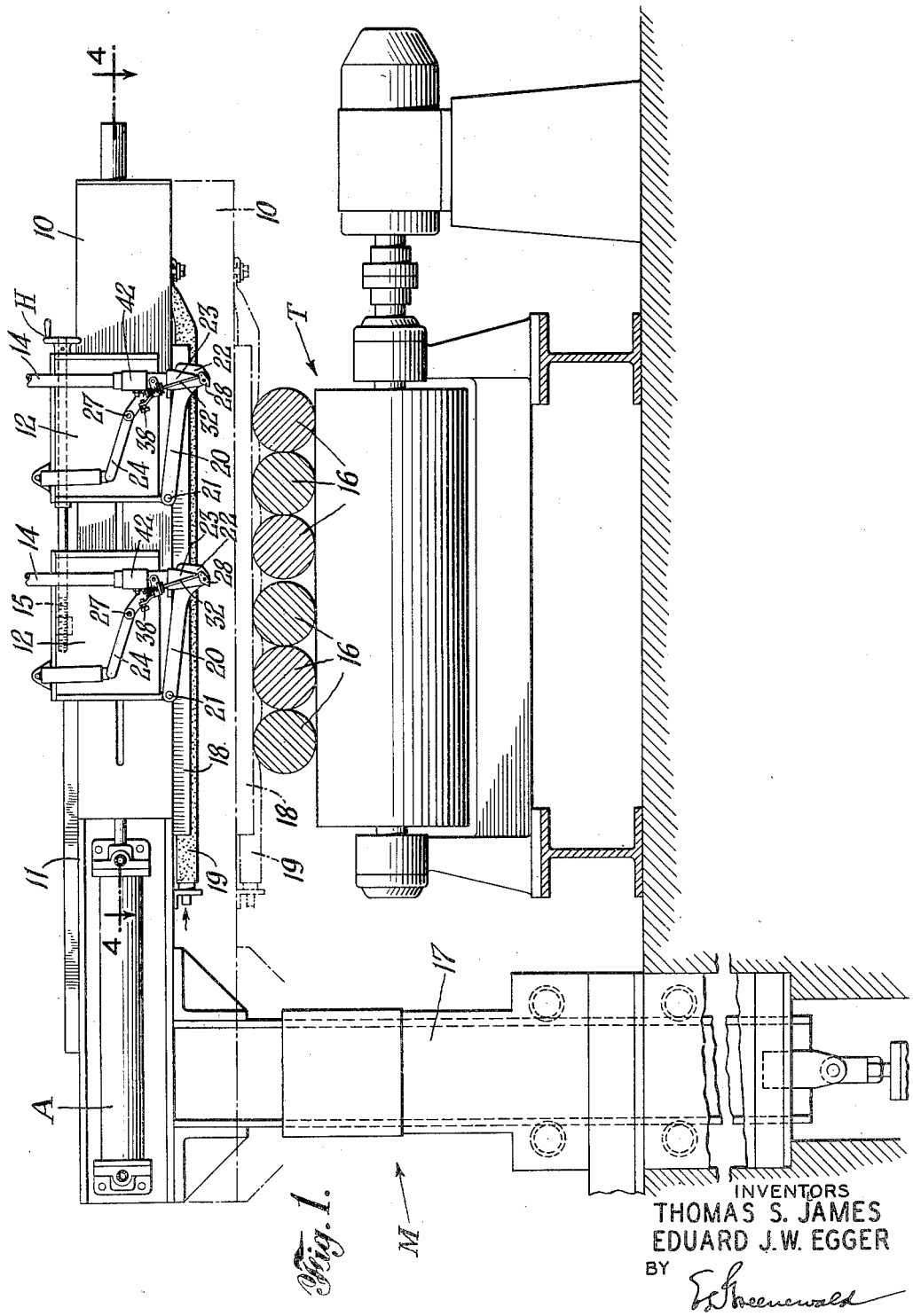

2,521,222

UNITED STATES PATENT OFFICE 2,521,222

OXY-FUEL GAS CUTTING MACHINE

Thomas S. James, Ben Avon, and Eduard J. W. Egger, Pittsburgh, Pa., assignors to The Linde Air Products Company, a corporation of Ohio Application January 10, 1946, Serial No. 640,198

5 Claims. (Cl. 266—23)

This invention relates to oxy-fuel gas cutting machines and more particularly to an automatic mechanism for initiating the flow of powder or other suitable adjuvant material to accelerate the starting of a metal cutting or metal removing operation.

In the manufacture of steel, the molten steel is cast into ingots, which are passed through a rolling mill to produce elongated metal bodies, such as blooms, billets, and bars. It is desirable to cut such elongated bodies into sections to provide shorter lengths for further treatment or use in various operations. Steel mills have used mechanically actuated shears for this purpose, but the first cost and power consumption of such shearing equipment are quite high.

As an economical alternative to the shearing equipment it has been proposed to cut the elongated bodies by means of the oxy-acetylene cutting blowpipe, and machines have been developed to support the blowpipe and propel it across the metal body to perform this cutting operation. However, the cutting blowpipe has a cutting speed limitation proportional to the thickness of the stock, which presents a problem in keeping pace with mill production.

Heretofore, in cutting cold steel bars by the oxy-fuel gas process, it has been necessary to cause the cutting blowpipe to dwell in the starting position until the work is sufficiently preheated for the ferrous metal to react with the cutting oxygen stream. This preheating period not only consumes considerable time in repetitive cutting operations, such as bar cutting, for example, but complicates the controls, since the cutting oxygen cannot be turned on and the blowpipe movement cannot be started until the work has been preheated adequately.

It is therefore the main object of the present invention to provide apparatus for increasing the speed of thermochemical cutting of elongated metal stock. This is accomplished in two phases which may be employed separably or combined. The first phase comprises supplying adjuvant material to the thermochemical reaction zone on the work, and the second comprises simultaneously cutting substantially parallel lengths of stock by tandem streams of cutting oxygen advanced in a plane transverse to the longitudinal axes of the lengths.

Another object of the invention is to provide automatic means for entirely avoiding the delay involved in preheating the work for starting an oxy-fuel gas metal removing process. This is accomplished by a novel automatic starting mechanism for obtaining instantaneous starts even with cold work, such as steel bars. Another object is to provide improved means for quickly severing metal bars.

According to the invention combustible adjuvant material, such as iron powder, is supplied momentarily in the starting zone to obtain a quick start. The automatic powder flow starting mechanism comprises a mechanical tripping device used to actuate an electrical switch which initiates an electrical timing device and an electrically controlled valve suitable for the control of the powder or other medium used in conjunction with oxygen and acetylene, or other fuel gas, in starting the thermochemical cutting of a steel body, for example. Relative movement between the mechanism and the steel body, causes operation of a detector such as a counterclockwise rotatable trip dog, the rotation of which depresses an electrical switch, closing the circuit to an electric timer and an electric powder control valve, causing the valve to open and permit the flow of powder to the blowpipe. The period during which the powder control valve is open is controlled by the timer and may be adjusted to suit operating conditions.

In the drawings:

Fig. 1 is a view in front elevation of a dual blowpipe round bar cutting machine exemplifying the invention, the work being shown in cross-section on a conventional conveyor;

Fig. 2 is an enlarged view mainly in front elevation showing details of the automatic powder flow starting mechanism associated with one of the blowpipes;

Fig. 3 is a view partly in side elevation and partly in vertical cross-section taken on line 3—3 of Fig. 2;

Fig. 4 is a fragmentary view partly in plan and partly in horizontal cross-section taken on line 4—4 of Fig. 1; and Fig. 5 is a diagrammatic view of the automatic powder flow starting mechanism including the electrical control circuit.

The illustrated cutting machine M comprises a horizontal boom 10 having a track 11 upon which two movable carriages 12 are mounted by means of wheels 13. The carriages are connected together by a screw 15 provided with a handle H for adjusting the horizontal spacing of the carriages. Each carriage 12 is provided with a single cutting blowpipe 14 which is mounted in such a way as to permit vertical floating of the blowpipe 14 to conform to the periphery of a round steel bar 16, for example. The boom is mounted on an elevator 17 positioned to one side of a conveyor C.

In operation, a number of long steel round bars 16, such as the six shown in Fig. 1, are positioned in side by side relation under the cutting machine M by the conveyor T. The blowpipes 14 are adjusted by turning the wheel H until one blowpipe is above the right hand edge of the bar at the right and the other blowpipe is above the corresponding edge of the fourth bar from the right. The horizontal boom 10 is then lowered by the elevator 17 until an inverted channel 18 contacts the top of the rounds 16, and the carriages 12 are motivated simultaneously by a pneumatic motor A in a leftward direction as seen in Fig. 1 in order to produce the severing cuts. A smaller motor E, acting on the escapement principle, controls the speed of movement of the carriages 12 during the cutting stroke. The channel 18 contains a pneumatic cushion 19, such as a length of rubber hose protruding downwardly, which acts as a shock absorber when the boom is lowered on the work 16. However, the member 19 is provided primarily for the purpose of preventing the work, especially when round, from rolling or moving during the cutting operation.

In order to insure the starting of each cut as the blowpipes 14 reach each round bar, combustible metal powder is supplied through each blowpipe to a starting zone on the edge of the work adjacent the working end of each blowpipe at the point of initial impingement of the cutting oxygen jet. It is desirable to have the powder "on" during a short period at the start of each cut. In order to accomplish this, the mechanism described below is provided.

A floating link 20 is pivoted at 21 to the carriage 12. The link has a fork 22 at one end to which is pivoted a yoke 23 containing cutting blowpipe 14. This provides a floating support that will raise or lower the blowpipe 14, depending upon the contour of the surface of the piece 16 which is being severed, as the fork 22 rides thereon. A stabilizing arm 24 and spring 26 serve to maintain the blowpipe 14 in a substantially vertical position and also minimize the drag resistance of the floating link 20. The arm 24 is pivoted to the carriage at 27.

Two suitably shaped trip cams, triggers or dogs 28 are pivotally mounted on the tines of link 20 by means of stud screws 30. Attached to each dog are push rods 32, the upper end portions of which contain shoulders 34 which are in contact with a switch yoke 36. The switch yoke is pivoted at 37 to the member 23. Counterclockwise rotation of either dog 28 will cause an upward thrust, by means of rod 32, of yoke 36, causing an adjusting screw 38 to contact and depress the actuating plunger 40 of a microswitch 42. Micro-switch 42 in turn completes an electrical circuit 44 which initiates an adjustable electric timing device 46 and demagnetizes a magnetic valve 48 used to control the flow of the starting powder through a conduit 50 leading from a source of supply such as a pneumatic powder dispenser P to the blowpipe. The timer 46 controls the period during which the magnetic valve 48 is deenergized and by means of a predetermined setting, the period during which the powder is "on" may be regulated.

In operation, the trip cam 28 actuates the micro-switch which initiates the timer 46 having normally open contacts. These contacts are closed during the timing period and control a relay R having a set of normally closed contacts C. During the timing period the contacts C of the relay R are open, which deenergizes the magnetic valve 48. At the expiration of the timing period, the relay contacts C are closed, energizing the magnetic valve 48 and thus stopping the flow of powder from container P, which is connected to a source of air under pressure through pipe 49.

At the completion of the timing period, the timer 46 is not automatically reset until the micro-switch 42 again opens the timer circuit 44. Reset spring 50 returns the yoke 36 to a stop position as soon as both dogs 28 are free of obstruction. When the dogs 28 strike the next bar in line after completion of the cut on the preceding bar the timer circuit is again closed and a flow of powder to the zone of initial impingement of the oxygen against the next bar in line is maintained for a brief period, whereby the cutting operation proceeds continuously from one bar to the next without the interruption formerly required for preheating the initial zone of the next bar to its ignition temperature. The blowpipes are rapidly returned to their initial positions by reversing the common drive A after all the bars have been severed.

Inasmuch as it is possible for the blowpipe 14 to be lowered inadvertently at some point on the periphery of a round bar 16 other than at the starting zone, at which point it would not be practical to attempt starting the cut, the dogs 28 are so constructed and arranged that powder flow is released only when the blowpipe 14 approaches the rounds 16 in a horizontal direction with the normal cutting movement (from the right in Fig. 1). When approaching the surface of a round 16 in a vertical direction, or while moving counter to the normal cutting movement (from the left in Fig. 1), dog 28 is caused to rotate in a clockwise direction when it strikes the round. This rotation presents a pull on the rods 32, causing compression of springs 51 but does not raise yoke 36 to actuate the micro-switch 42.

The timer control circuit 44 is adapted to be connected to a suitable electrical power supply circuit 52 by a line switch 54. Closure of such switch also connects a circuit 56 to the supply circuit 52, which circuit 56 includes the relay contacts C and the winding of the magnetic valve 48.

The invention makes it possible to cut ferrous metal bodies thermochemically by the oxy-fuel gas process, efficiently and rapidly, since the interruption for preheating to start each cut is eliminated, the operation being continuous across a plurality of bodies, regardless of their contours. The invention is not limited to severing, but is equally applicable to other thermochemical metal removing operations such as deseaming, desurfacing, gouging, and the like. In the case of hard-to-work metals such as stainless steel and certain other alloys which resist progressive oxidation by the sole action of an oxygen jet impinging on a heated portion thereof, the system readily may be adjusted so that the powder feed continues during the working of each body at the same or at a reduced rate after the metal removing operation is started. For example, the timer 46 may be adjusted to continue the powder feed during the entire cutting stroke, or a simple shunt circuit SC may be connected across the timer for such type of work. Thus, the valve 48 is directly controlled by the switch 42.

In case non-magnetic powder or flux material is used, any suitable valve may, of course, be substituted for the magnetic powder valve, without departing from the invention. The invention, as pointed out above, is not limited to severing metal bodies, but may be applied to any cutting operation such as metal removal, gouging, deseaming, desurfacing, scarfing, edge preparation, and the like, thermochemically with oxygen.

What is claimed is:

1. In an oxygen cutting machine the combination with a horizontal boom mounted for vertical movement, and at least one cutting blowpipe mounted on said boom for horizontal movement, of an inverted channel secured to the bottom of said boom, and a pneumatic cushion disposed in said channel and normally protruding downwardly for action as a shock absorber when the boom is lowered on the work and operative, especially when such work is round, to prevent the work from moving or rolling during the cutting operation by said blowpipe.

2. An oxy-fuel gas cutting machine for thermochemically severing horizontal bars of ferrous metal with a stream of gaseous oxygen assisted by oxy-fuel gas preheating flames, comprising the combination of an elevator, a horizontal boom mounted on said elevator, a cushion carried under said boom which is adapted to rest on the bars to be severed when the boom is lowered into operative position, at least one carriage mounted to travel horizontally on said boom during the bar severing operation, a floating link pivoted to said carriage so that the free end thereof can ride on the bars as the carriage moves thereover, an oxy-fuel gas cutting blowpipe mounted on the free end of said link for vertical movement therewith following the contour of the bars during the cutting stroke of the carriage, a dog pivotally mounted on the free end of said link to engage each bar in succession during the cutting stroke of the carriage, an electrical switch mounted on said link and operatively connected to said dog whereby engagement of each bar by the dog closes the switch, an adjustable timer electrically associated with said switch which timer is energized when the switch closes, a conduit connecting a pneumatic dispenser of adjuvant iron powder to said cutting blowpipe, and a valve in said conduit which controls the flow of powder supplied to said blowpipe from said dispenser, said valve being electrically associated with said timer so that the valve is held open for a predetermined interval by and in response to the energization of said timer, whereby adjuvant iron powder automatically is supplied to the cutting blowpipe as the latter approaches each bar by virtue of the engagement of the dog with such bar, and continues to be supplied thereto for the time interval adjustment of said timer, the cushion firmly engaging the bars and securing them against lateral displacement by the dog during the cutting stroke of the carriage.

3. An oxy-fuel gas cutting machine, as defined by claim 2, which includes a common carriage drive for simultaneously moving a plurality of such carriages along the boom during the cutting stroke thereof.

4. An oxy-fuel gas cutting machine, as defined by claim 2, in which a stabilizing arm and spring on the carriage serve to maintain the blowpipe in a substantially vertical position and also minimize the drag resistance of the floating link during the cutting stroke.

5. An oxy-acetylene gas cutting machine for thermochemically severing horizontal rounds of ferrous metal with a stream of gaseous oxygen assisted by oxy-fuel gas preheating flames, comprising the combination of a horizontal boom, a cushion carried under said boom which is adapted to rest on the rounds to be severed, at least one carriage mounted to travel horizontally on said boom during the round severing operation, a floating link pivoted to said carriage so that the free end thereof can ride on the rounds as the carriage moves thereover, and an oxy-fuel gas cutting blowpipe mounted on the free end of said link for vertical movement therewith following the contour of the rounds during the cutting stroke of the carriage, the cushion firmly engaging the rounds and securing them against movement during such cutting stroke of the carriage.

THOMAS S. JAMES.
EDUARD J. W. EGGER.

REFERENCES CITED

The following references are of record in the file of this patent:

UNITED STATES PATENTS

| Number | Name | Date |
|---|---|---|
| 968,350 | Harrison | Aug. 23, 1910 |
| 1,084,692 | Bucknam | Jan. 20, 1914 |
| 1,554,408 | Coberly | Sept. 22, 1925 |
| 1,879,346 | Lawrence | Sept. 27, 1932 |
| 2,136,772 | Free | Nov. 15, 1938 |
| 2,184,561 | Babcock et al. | Dec. 26, 1939 |
| 2,269,636 | Mott | Jan. 13, 1942 |
| 2,293,853 | Rountree | Aug. 25, 1942 |
| 2,309,096 | Bucknam et al. | Jan. 26, 1943 |
| 2,326,906 | Walter | Aug. 17, 1943 |
| 2,345,314 | Anderson | Mar. 28, 1944 |
| 2,345,688 | Smith | Apr. 4, 1944 |
| 2,451,422 | Wagner | Oct. 12, 1948 |

FOREIGN PATENTS

| Number | Country | Date |
|---|---|---|
| 641/26 | Australia | Feb. 19, 1926 |
| 549,781 | Germany | May 2, 1932 |

OTHER REFERENCES

Metals Handbook, 1939 Edition, pages 930-935, pub. by American Society for Metals, Cleveland, Ohio.

Heat Treating and Forging, January 1943, page 44.